June 12, 1928.

C. SCHAEFFER 1,673,340

SLEEVE VALVE ENGINE

Filed May 11, 1926

C. Schaeffer
Inventor

By: Marks & Clerk
Attys

Patented June 12, 1928.

1,673,340

UNITED STATES PATENT OFFICE.

CHARLES SCHAEFFER, OF PARIS, FRANCE, ASSIGNOR TO SOCIETE ANONYME DES ANCIENS ETABLISSEMENTS PANHARD & LEVASSOR, OF PARIS, FRANCE.

SLEEVE-VALVE ENGINE.

Application filed May 11, 1926, Serial No. 108,404, and in France June 16, 1925.

It has been remarked that with sleeve-valve engines in which the fluids are controlled by steel sleeves, the suction and exhaust ports are subject to clogging, and will become stopped up after a certain time of operation, and this has a marked effect upon the efficiency of the engine and requires frequent inspections.

The present invention relates to a device whereby this disadvantage is obviated and in which the cylinder head is provided with a boss which is inserted into the ports; the said ports are slidable upon the said bosses whereby all clogging is obviated.

The appended drawing shows by way of example an embodiment of the said invention.

Figure 1:
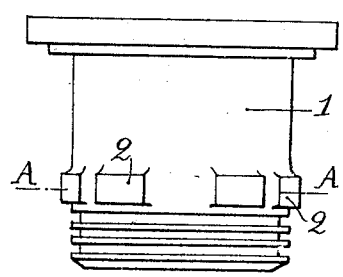
Fig. 1 is an elevational view of the cylinder head of a sleeve-valve engine according to the invention.
Figure 3:
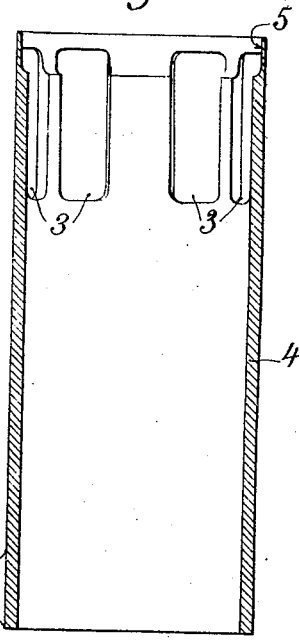
Fig. 3 is a vertical section of the sleeve.
Figure 2:
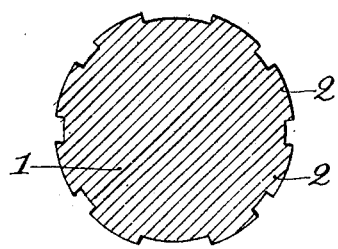
Fig. 2 is a corresponding horizontal section on the line A—A of Fig. 1.
Figure 4:
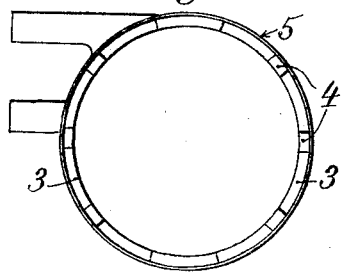
Fig. 4 is the corresponding plan view.
Figure 5:
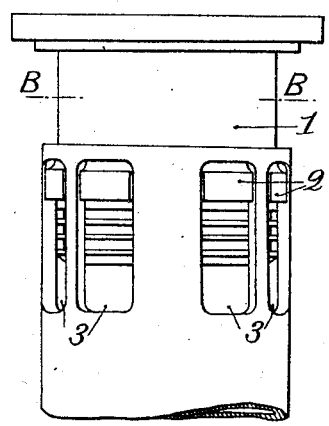
Fig. 5 is an elevational view showing the sleeve mounted on the cylinder head.
Figure 6:
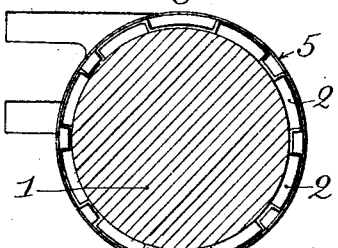
Fig. 6 is a horizontal section on the line B—B of Fig. 5.

In Fig. 1, 1 is the main body of the cylinder head which comprises the tenons 2 engaging in the ports 3 of the sleeve 4. To facilitate its mounting on the cylinder head, said sleeve is preferably recessed at the top at 5. The diameter of the cylinder head adjacent the tenons 2 corresponds to the diameter of the recessed part, and the tenons are slightly set back with reference to the external surface of the sleeve.

The height of the ports 3 is such that the tenons will always remain engaged therein, and will not interfere with the reciprocating motion of the sleeve, and it will be readily observed that the displacement of the sleeve relatively to the tenons will prevent all clogging of the said ports.

The said tenons have a further advantage from the fact that they guide the said sleeve in its reciprocatory motion and will counteract all rotation of the sleeve due to its uncentered control.

The recess 5 still allows a small thickness of the sleeve which serves to unite the metal parts situated between the ports.

It is also feasible to eliminate the recess 5 and to allow the ports 3 to open at the top of the sleeve whereby the mounting and trimming of the sleeve will be facilitated and the amount of the projection of the tenons will be augmented.

Having thus described my apparatus, what I claim as new therein, and my own invention, is:—

In an arrangement adapted to prevent the clogging of the suction and the exhaust ports of sleeve-valve engines, the combination of a sleeve-valve which is slidable in the cylinder of the engine and in which are formed suitable suction and exhaust ports in longitudinal disposition, a cylinder head adapted to be mounted on said cylinder and in friction contact with the internal wall of the said sleeve, and bosses formed upon the said cylinder head, said bosses being adapted to engage in the said ports and to slide therein when the said sleeve is displaced.

In testimony whereof I have hereunto affixed my signature.

CHARLES SCHAEFFER.